United States Patent [19]

Jackson et al.

[11] Patent Number: 5,819,526
[45] Date of Patent: Oct. 13, 1998

[54] LOW POWER ARCJET PROPELLANT FEED SYSTEM

[75] Inventors: Bernard Jackson, Diamond Bar; Robert Lewis Sackheim, Rancho Palos Verdes; Richard Aaron Rosenthal, Redondo Beach, all of Calif.

[73] Assignee: TRW Inc., Redondo Beach, Calif.

[21] Appl. No.: 606,184

[22] Filed: Feb. 23, 1996

[51] Int. Cl.$^6$ .................................................. F02K 9/56
[52] U.S. Cl. ...................... 60/203.1; 60/39.462; 60/204; 219/121.51
[58] Field of Search ................... 60/204, 203.1, 60/39.462; 219/121.51

[56] References Cited

U.S. PATENT DOCUMENTS

| | | |
|---|---|---|
| 4,319,926 | 3/1982 | Nowakowski et al. . |
| 4,523,429 | 6/1985 | Bingley . |
| 4,548,033 | 10/1985 | Cann . |
| 4,577,461 | 3/1986 | Cann . |
| 4,656,828 | 4/1987 | Bingley et al. . |
| 4,766,724 | 8/1988 | Gruber . |
| 4,800,716 | 1/1989 | Smith et al. . |
| 4,805,399 | 2/1989 | McKevitt . |
| 4,882,465 | 11/1989 | Smith et al. . |
| 4,926,632 | 5/1990 | Smith et al. . |
| 4,930,310 | 6/1990 | McKevitt . |
| 4,995,231 | 2/1991 | Smith et al. . |
| 5,026,259 | 6/1991 | Whitehead et al. . |
| 5,170,623 | 12/1992 | Dailey et al. . |
| 5,282,357 | 2/1994 | Sackheim . |
| 5,312,073 | 5/1994 | Flament et al. . |

OTHER PUBLICATIONS

*Low–Power Arc Jet Thruster System Development (LPATS)*, Sep. 7, 1994.

*Primary Examiner*—Timothy Thorpe
*Assistant Examiner*—Ted Kim
*Attorney, Agent, or Firm*—Michael S. Yatsko

[57] ABSTRACT

A lower power arcjet propellant feed system for delivering propellant to a low power arcjet. The low power arcjet propellant feed system includes a liquid propellant storage chamber for storing a liquid propellant. A gas generator in communication with the liquid propellant storage chamber generates a gaseous propellant upon receipt of the liquid propellant from the liquid propellant storage chamber. A gas plenum in communication with the gas generator accumulates the gaseous propellant from the gas generator up to a desired pressure. Actively controllable valves actively control the flow of the liquid propellant into the gas generator and actively control the flow of the resultant gaseous propellant out of the gas generator and into the gas plenum up to the desired pressure. A substantially continuous and stable low flow rate of gaseous propellant is then delivered to the low power arcjet.

23 Claims, 1 Drawing Sheet

LOW POWER ARCJET PROPELLANT FEED SYSTEM

BACKGROUND OF THE INVENTION

1. Field of the Invention

This invention relates generally to very low flow rate propellant feed systems and, more particularly, to a low power arcjet propellant feed system for delivering propellant to low power arcjets.

2. Discussion of the Related Art

In order to place and maintain spacecraft, such as satellites, in geosynchronous and low earth orbits, various types of thrusters are utilized to perform station keeping, attitude control and delta velocity maneuvers, which are sometimes referred to as reaction control system (RCS) functions. The thrusters used to perform these functions include typical chemical reaction thrusters which generally consume large quantities of propellant or high power arcjet thrusters which extend the performance of chemical reaction thrusters by consuming less propellant.

The high power arcjet thrusters in use today generally operate by decomposing a liquid propellant to form a gaseous propellant. The gaseous propellant is subsequently heated with an electric arc and expanded through a nozzle of the thruster to provide thrust. These high power arcjet thrusters typically operate in a power range of between about 1.0 kilowatts to 25 kilowatts and utilize liquid hydrazine ($N_2H_4$) as the propellant. The liquid hydrazine is decomposed and the resulting gas propellant, generally consisting of ammonia, hydrogen and nitrogen, is fed to the arcjet thruster at a high flow rate of about 30 grams per second.

These high power arcjets have a higher specific impulse ($I_{SP}$) than the typical chemical reaction thruster, which is defined as the thrust developed by an engine per unit of propellant weight flow rate. However, improvements in the next generation arcjet thruster is needed to reduce power while still maintaining specific impulse ($I_{SP}$) value much higher than chemical RCS thrusters. By doing this, the operating life of lower power, smaller spacecraft is increased due to conserving propellant consumption well below that of chemical thrusters. Moreover, the size and weight of the spacecraft can also be reduced, thereby reducing launch costs. To achieve these results, the next generation arcjets will be low power and low flow arcjets. The power applied to the arcjet will typically range between 400 to 800 watts and flow rate will typically range between 3 to 50 milligrams per second.

Downsizing of conventional propellant feed systems used in high power arcjets to feed low power arcjets may initially appear to be straightforward. However, after closer inspection, several disadvantages and unforeseen challenges arise. Specifically, use of a conventional high power arcjet feed system in which a gas generator is directly coupled to a low power arcjet exhibits several problems.

First, a typical gas generator is too large and provides a flow rate much greater than that required to run a low power arcjet. Moreover, the size of the gas generator cannot be simply reduced because the useful life of the gas generator is then significantly decreased. Second, the flow rate of gas propellant directly from the gas generator tends to oscillate. This oscillation causes unstable and varying pressure resulting in flow rate fluctuations which ultimately causes uncontrolled fluctuations in thrust out of the arcjet. Third, use of only the gas generator directly coupled to the arcjet causes flow instability at low flow rates, in contrast to the high flow rate used for high power arcjets, which will tend to "unstart" the arcjet (or kill the formation of the arc) by suppressing electric conduction of the arc between the electrodes. Fourth, during blow down in a closed system, it is very difficult, if not impossible to provide a steady continuous gas flow rate to a low power arcjet directly from the gas generator. Fifth, low flow rate direct-flow gas generators are very sensitive to any gas bubbles in the upstream liquid feed to the gas generator, which will cause further arcjet erratic behavior and shorten arcjet life. Finally, by simply reducing the flow rate from the gas generator, the feed tubes, as well as the gas generator itself, tend to heat up, which may ultimately cause ignition within the feed system.

What is needed then is a low power arcjet propellant feed system which does not suffer from the above mentioned disadvantages. This will, in turn, provide a steady state unperturbable mass flow rate to the low power arcjet regardless of upstream pressure; provide an optimized flow rate at a controllable pressure to the arcjet independent of the gas generator; eliminate the feed system from heating up or igniting due to low flow rates; and provide a controllable flow rate so that the thrust from the arcjet can be dynamically controlled as required and the electric arc can be stably sustained through a steady conducting medium (i.e., the gas feed). It is, therefore, an object of the present invention to provide such a low power arcjet propellant feed system.

SUMMARY OF THE INVENTION

In accordance with the teachings of the present invention, a low power arcjet propellant feed system for delivering propellant to a low power arcjet is disclosed. The low power arcjet propellant feed system provides a substantially continuous and stable low flow rate of a gaseous propellant to the low power arcjet. This substantially continuous and stable low flow rate enables precision thrust control of the low power arcjet and stable arcjet operation. Moreover, the substantially continuous and stable low flow rate can be controllably adjusted so that the thrust from the low power arcjet can be dynamically varied over a wide range as required.

In one preferred embodiment, a liquid propellant storage chamber stores a liquid propellant. A gas generator in communication with the liquid propellant storage chamber generates a gas propellant upon receipt of the liquid propellant from the storage chamber. A gas plenum in communication with the gas generator accumulates the gas propellant from the gas generator up to a desired pressure. Controllable valves actively control the flow of the liquid propellant into the gas generator and actively control the flow of the resultant gas propellant out of the gas generator into the gas plenum up to the desired pressure. This allows a substantially continuous and stable low flow rate of gas propellant to be delivered to the low power arcjet.

Use of the present invention provides a low power arcjet propellant feed system for delivering propellant to a low power arcjet. As a result, the aforementioned disadvantages associated with utilizing the currently available propellant feed systems have been substantially eliminated.

BRIEF DESCRIPTION OF THE DRAWING

Still other advantages of the present invention will become apparent to those skilled in the art after reading the following specification and by reference to the drawing in which.

DETAILED DESCRIPTION OF THE PREFERRED EMBODIMENT

Figure 1:
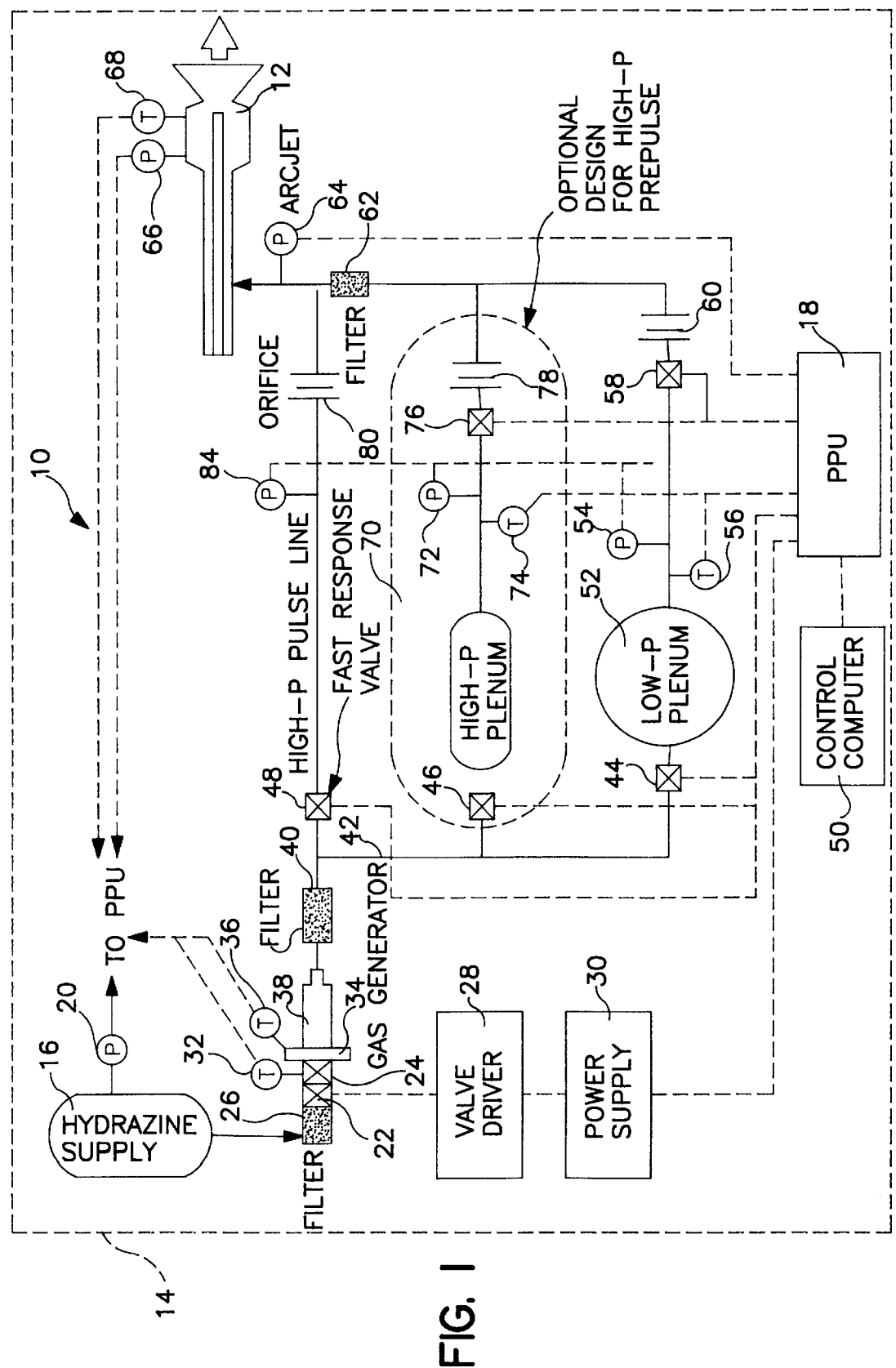
FIG. 1 is an overall system block diagram of one preferred embodiment of the present invention.

The following description of the preferred embodiment concerning a low power arcjet propellant feed system is merely exemplary in nature and is in no way intended to limit the invention or its application or uses. Moreover, while the preferred embodiment is discussed below with reference to a satellite, those skilled in the art would also recognize that the low power arcjet propellant feed system can be incorporated into other types of spacecraft.

Referring to FIG. 1, a low power arcjet propellant feed system 10 is shown in a system environment. The low power arcjet propellant feed system 10 can be incorporated into various types of spacecraft, such as satellites, in order to feed multiple low power arcjet thrusters 12 onboard a satellite 14. The satellite 14 is first placed into low earth orbit or parking orbit using a delivery craft (not shown). Once in parking orbit, the low power arcjet thrusters 12 onboard the satellite 14 are used to position and maintain the satellite 14 within any desired orbit using the available energy onboard the satellite 14.

The low power arcjet propellant feed system 10 includes an unregulated pressurized supply tank 16 used to preferably hold from about a few tens of pounds to hundreds of pounds of a liquid hydrazine ($N_2H_4$) propellant. This liquid hydrazine propellant is initially held at a pressure of about 400 psia (pounds per square inch absolute) within the supply tank 16 using preferably a nitrogen ($GN_2$) or helium (He) gas. Those skilled in the art would also recognize that other types of liquid propellant and gas may be used within the feed system 10. The pressure in the supply tank 16 is monitored by a control unit 18, discussed in more detail shortly, via a pressure transducer 20.

Upon opening a pair of actively controllable valves 22 and 24, the pressure in the supply tank 16 forces the liquid hydrazine out of the supply tank 16 and through a filter 26. The filter 26 filters out any impurities or contaminants in the liquid hydrazine using a 10 micron absolute filter 26. The pair of valves 22 and 24 are in series and simultaneously opened and closed by a valve driver 28 powered by a power supply 30 and controlled by the power processing unit 18. By using the two valves 22 and 24 in series, a redundant safety feature is provided so that if one valve fails, the power processing unit 18 is still able to inhibit the flow of liquid hydrazine using the other operable valve. Attached to the valve 24 is a thermocouple 32 used to sense the temperature of the liquid hydrazine flowing through the valve 24 in order to insure that the maximum operating temperature of the valves 22 and 24 are not exceeded.

As the liquid propellant passes through the actively controllable valves 22 and 24, the liquid propellant enters a flow limiter 34 having a thermocouple 36. The flow limiter 34 is a fixed flow rate device which provides a fixed flow rate at a given pressure. Thus, by knowing the pressure in the supply tank 16, via the pressure transducer 20, the flow rate into a gas generator 38 is also known. The controlled flow of liquid hydrazine is then distributed over a catalyst bed inside the gas generator 38 which is preferably a Shell 405 catalyst bed. This causes the liquid hydrazine to be decomposed in an exothermic reaction to produce a gaseous propellant of ammonia, hydrogen and nitrogen. The gaseous propellant is then filtered by a 10 micron absolute filter 40 to remove any impurities which may have broken off from the catalyst bed during the exothermic reaction.

The filtered gas propellant is directed along tubular feed lines 42 having an inner diameter of about 0.25 inches to three (3) activately controllable valves 44, 46 and 48. Each valve 44, 46 and 48 uses a valve driver and a power supply (not shown), similar to the valve driver 28 and the power supply 30, and are controlled by the power processing unit 18 which is in turn controlled by a control computer 50. The power processing unit 18 is similar to other power processing units currently used in existing satellites and is built using commercially available off the shelf components known to those skilled in the art.

The power processing unit 18 provides an arc voltage to the arcjet thruster 12 of between about 90 volts to 200 volts which is scalable to between about 400 watts to 4 kilowatts. The power processing unit 18 further performs the overall control and telemetry/status functions for the arcjet thruster 12, via the control computer 50. The power processing unit 18 also provides real time control of the arcjet 12 based on external commands from a ground based satellite controller (not shown), as well as data obtained from the various pressure and temperature sensors located within the low power arcjet propellant feed system 10. A DC to DC converter (not shown) within the power processing unit 18 increases the internal satellite voltage from about 28 volts to the required voltage level to power the system 14.

The power processing unit 18 is controlled by the control computer 50 which preferably utilizes a single digital signal processor (DSP) microcontroller. The control computer 50 provides real time control of the arcjet thruster 12, as well as real time control of the various actively controllable valves throughout the low power arcjet propellant feed system 10 based on the various closed loop feedbacks positioned within the system 10.

Upon opening valve 44, a low pressure plenum 52 is controllably pressurized with the gas propellant up to a desired pressure in the range of between about 35 to 250 psia and preferably to about 50 psia. The low pressure plenum 52 essentially accumulates the gas propellant and holds the gas propellant at a desired pressure until it is subsequently fed on demand to the arcjet thruster 12. The low pressure plenum 52 is controllably pressurized by pulsing the gas generator 38, via the actively controllable valves 22 and 24, in combination with the actively controllable valve 44 which allows the low pressure plenum 52 to be controllably incremented up to the desired pressure. A pressure transducer 54 continuously monitors the pressure of the low pressure plenum 52 and a thermocouple 56 monitors the temperature of the low pressure plenum 52, which typically ranges between about 50° F. to 300° F. The pressure transducer 54 and the thermocouple 56 essentially form a closed loop feedback in order to actively control, in real time, the pressure in the low pressure plenum 52.

By continuously monitoring the pressure and temperature of the low pressure plenum 52 using a real time closed loop feedback, the low pressure plenum 52 can be controlled to hold the desired pressure of about 50 psia ±2 psia, or any other desired pressure. For example, if the low pressure plenum 52 is opened, via valve 58, the pressure in the low pressure plenum 52 will drop only to about 47.9 psia. Since the low pressure plenum 52 is continuously monitored by the pressure transducer 54, upon reaching 47.9 psia, the actively controllable valve 44 will be opened, as well as the gas generator 38 pulsed with additional liquid hydrazine at a known rate, via actively controllable valves 22 and 24, so that the low pressure plenum 52 is again pressurized up to about 52 psia. In other words, the low pressure plenum 52 is actively controlled to hold the gas propellant at the desired pressure while the low pressure plenum 52 supplies the gas propellant to the arcjet thruster 12.

Upon opening valve 58, the gas propellant passes through a sonic orifice 60, which acts as a fixed choke, to provide a very low flow rate of between about 1 to 10 milligrams per second at a given pressure. Therefore, since the pressure of the low pressure plenum 52 can be actively controlled and varied, via the actively controllable valves 22, 24 and 44 and the closed loop feedback, the flow rate can be set to any desired low flow rate, preferably between about 1 to 10 milligrams per second.

The gas propellant having the stable and controlled low flow rate passes through a filter 62 to filter out any additional impurities or contaminants from the gas propellant prior to passing into the arcjet thruster 12. By filtering out any impurities before the gas reaches the arcjet thruster 12, this prevents the impurities from shorting out or sputtering within the electric arc generated within the arcjet thruster 12. A pressure transducer 64 is used to monitor the pressure of the gas feeding the arcjet 12 in order to insure that the arcjet 12 is receiving the proper flow rate of gas. While the arcjet thruster 12 is in operation, an additional pressure transducer 66 and a thermocouple 68 are utilized to ensure that the arcjet thruster 12 is operating and firing properly.

Turning to valve 46, upon opening valve 46, an optional high pressure plenum 70 is controllably pressurized with the gas propellant up to a desired pressure in the range of between about 100 to several hundred psia, similar to the way the low pressure plenum 52 is controllably pressurized. The high pressure plenum 70 is also monitored by a pressure transducer 72 and a thermocouple 74 while an actively controllable valve 76 is used to supply the gas propellant at a high pressure to the arcjet thruster 12 through a sonic orifice 78. The sonic orifice 78 controls the flow rate of the heated gas in the range of 10 to 100 milligrams per second. The high pressure plenum 70 is generally utilized for providing a high pressure start-up pulse to the arcjet thruster 12. The start-up pulse is used when the arcjet thruster 12 is first fired up before being operated in a steady state condition via the low pressure plenum 52.

Turning to valve 48, the valve 48 allows the gas propellant to flow directly from the gas generator 38 through a sonic orifice 80 and into the arcjet thruster 12 or to other thrusters (not shown) positioned onboard the satellite 14. The heated gas passes through the valve 48 and into a high pressure pulse line 82 which is monitored by a pressure transducer 84 to determine the pressure of the gas and the resultant flow rate out of the sonic orifice 80. This high pressure pulse line 82 is generally used when the satellite requires higher thruster power (i.e. high specific impulse, $I_{SP}$) to move the satellite greater distances or for start-up conditions of the arcjet thruster 12, similar to the use of the high pressure plenum 70.

By providing multiple feeds, via valves 44, 46 and 48, multiple arcjet thrusters 12 (not shown) can be individually controlled or operated to control the movement of the satellite 14. Moreover, by providing the high pressure pulse line 82 or the high pressure plenum 70, there is no need during start-up of the arcjet thruster 12 to raise the pressure in the low pressure plenum 52 up to the start-up pulse pressure and then subsequently bleed off the pressure within the low pressure plenum 52, via a bleed valve (not shown), before the arcjet 12 is driven in a steady state condition.

In operation, the satellite 14 is first placed into a parking orbit or low earth orbit, via a separate launch vehicle (not shown). Upon being placed in this parking orbit, the satellite 14 is either controlled, via a ground based control center through the control computer 50 and the power processing unit 18 or controlled autonomously to place the satellite 14 into any higher orbit as required for satellite operations. In order to feed the low power arcjet thruster 12, as well as additional arcjet thrusters (not shown), the power processing unit 18 pulses the valve driver 28 which pulses the actively controllable valves 22 and 24 on and off at about a 50% duty cycle where the valves 22 and 24 are opened for about 100 milliseconds and closed for about 100 milliseconds. By doing this, more control is achieved because the gas generator 38 is incrementally pulsed to generate gas which is subsequently supplied to the low pressure plenum 52, via the actively controllable valve 44.

The low pressure plenum 52 is controllably pressurized with the gas propellant from the gas generator 38 using the closed loop feedbacks from the pressure transducer 54 and the thermocouple 56. This is achieved by actively controlling valves 22 and 24, and actively controlling valve 44 in a pulsed manner to controllably increment the pressure in the low pressure plenum 52. The optimized or desired pressure to feed the arcjet thruster 12 is determined and held in the low pressure plenum 52 independent of the pressure in the gas generator 38. To start the arcjet thruster 12, either the high pressure pulse line 82 is utilized or the optional high pressure plenum 70, which is controllably pressurized similar to the low pressure plenum 52. The arejet thruster 12 is pulsed with a high pressure start-up pulse having a flow rate of about 25 milligrams per second at a pressure of about 300 psia to start the low power arcjet thruster 12.

Upon receiving the high pressure pulse, either valve 48 or 76 is actively closed and valve 58 is opened to supply a low pressure, low flow steady state gas propellant to the arcjet thruster 12. This provides a controllable steady state thrust from the low power arcjet thruster 12, independent of what is occurring within the gas generator 38. Moreover, the pressure in the low pressure plenum 52 can be controllably adjusted to any desired pressure, therefore providing a controllably adjusted unperturbable flow rate to the arcjet 12. Thus, the thrust from the arcjet 12 can be dynamically varied over a specific impulse ($I_{SP}$) range of about 400 seconds to 550 seconds, irrespective of the pressure in the supply tank 16.

By utilizing the low pressure plenum 52, a robust, long-life gas generator 38 can be utilized in a nontaxing, low duty cycle mode without concerns of flow instability due to the decomposition of the liquid hydrazine within the catalyst bed. As the liquid hydrazine supply is utilized within the supply tank 16 (i.e. blow-down) from about 2.4 to 0.7 MPa (400 to 100 psia), the arcjet thruster 12 can be operated without impacting on the arcjet flow rate from the low constant pressure plenum 52. For example, assuming the tank is 80% full of liquid hydrazine at 400 psia, and is empty at 100 psia, this generates a 4 to 1 blow-down which is not regulated at the supply tank 16. However, the arcjet thruster 12 can be operated at constant feed pressure, while the closed supply tank 16 blows down from the 400 psia to 100 psia range because the low constant pressure plenum 52 operates independent of the gas generator 38 and essentially decouples the fluctuating portion of the supply system 10 from the arcjet thruster 12. In addition, a flow rate tolerance of about ±2% can be maintained without the risk of instantaneous arcjet gas starvation because of the precision flow control, via the low pressure plenum 52, which equates to precision thrust control, via the arcjet thruster 12.

Still further, gas flow rate to the arcjet thruster 12 can be throttled by sending a new command to the control computer 50, which in turn will reduce the pressure in the low pressure plenum 52 by changing the gas generator 38 duty cycle. This condition would occur if the satellite 14 is exhibiting a power loss such that the power applied to the arcjet 12 is reduced. Therefore, the pressure in the low pressure plenum 52 is also reduced to provide the new required flow rate because of the lower power being applied to the low power arcjet thruster 12. Moreover, by using the low pressure plenum 52, gas supply pressure overshoots during ramp-ups and after shutdowns are eliminated or greatly minimized.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An arcjet propellant feed system for delivering propellant to an arcjet, said system comprising:
   a liquid propellant storage chamber for storing a liquid propellant;
   a gas generator communicating with said liquid propellant storage chamber, said gas generator generates a gas propellant upon receipt of said liquid propellant;
   a first gas plenum communicating with said gas generator, said gas plenum accumulating said gas propellant from said gas generator up to a desired first pressure; and
   controllable valve means for actively controlling the flow of said liquid propellant into said gas generator and actively controlling the flow of said gas propellant out of said gas generator and into said first gas plenum up to said desired pressure, wherein a substantially continuous and stable flow rate of said gas propellant is delivered to the arcjet.

2. The arcjet propellant feed system as defined in claim 1 further comprising control means for controlling said controllable valve means.

3. The arcjet propellant system as defined in claim 2 wherein said control means utilizes a plurality of closed loop feedbacks for actively controlling the controllable valve means.

4. The arcjet propellant feed system as defined in claim 1 wherein said controllable valve means includes a first valve coupled to said liquid propellant storage chamber for controlling the flow of said liquid propellant into said gas generator, a second valve coupled to said gas generator for controlling the flow of said gas propellant out of said gas generator and into said first gas plenum, and a third valve for controlling the flow of said gas propellant into the arcjet.

5. The arcjet propellant feed system as defined in claim 1 further comprising an orifice communicating with said first gas plenum, said orifice delivers said gas propellant from said first gas plenum to the arcjet at said substantially continuous and stable flow rate having said desired first pressure.

6. The low power arcjet propellant feed system as defined in claim 5 wherein said orifice delivers said gaseous propellant to the low power arcjet at a flow rate of between about 1 to 10 milligrams per second.

7. The arcjet propellant feed system as defined in claim 1 further comprising a second gas plenum communicating with said gas generator, said second gas plenum accumulating said gas propellant from said gas generator up to a desired second pressure which is higher than said first pressure.

8. A An arcjet propellant feed system for delivering propellant to a low power arcjet, said system comprising:
   storage means for storing a liquid propellant;
   first controllable valve means coupled to said storage means for actively controlling the flow of said liquid propellant out of said storage means;
   gas generator means coupled to said first controllable valve means for generating a gas propellant upon receiving said liquid propellant from said storage means;
   second controllable valve means coupled to said gas generator means for actively controlling the flow of said gas propellant out of said gas generator means;
   accumulator means coupled to said second controllable valve means for controllably accumulating said gas propellant up to a first desired pressure from said gas generator means; and
   third controllable valve means coupled to said accumulator means for delivering said gas propellant to the arcjet, wherein said gas propellant is delivered to the arcjet at a desired flow rate having said desired pressure.

9. The arcjet propellant feed system as defined in claim 8 further comprising control means for actively controlling said first, second and third controllable valve means.

10. The arcjet propellant feed system as defined in claim 9 wherein said first controllable valve means is controllably pulsed by said control means to actively control the flow of said liquid propellant out of said storage means and into said gas generator means.

11. The arcjet propellant feed system as defined in claim 8 further comprising an orifice coupled to said third controllable valve means for controlling the flow rate of said gaseous propellant delivered to the low power arcjet based on said desired pressure.

12. The arcjet propellant feed system as defined in claim 11 wherein said orifice provides a flow rate of about 1 to 10 milligrams per second.

13. The arcjet propellant feed system as defined in claim 8 further comprising first filter means for filtering said liquid propellant and second filter means for filtering said gaseous propellant.

14. A propellant feed system for delivering propellant to a thruster, said system comprising:
   a liquid propellant storage chamber for storing a liquid propellant;
   a controllable valve communicating with said liquid propellant storage chamber, said controllable valve actively controls the flow of said liquid propellant out of said liquid propellant storage chamber;
   a gas generator communicating with said controllable valve, said gas generator generates a gas propellant upon receipt of said liquid propellant from said liquid propellant storage chamber;
   a gas plenum communicating with said gas generator, said gas plenum controllably accumulating said gaseous propellant up to a desired controllable pressure from said gas generator; and
   an orifice communicating with said gas plenum, said orifice delivers said gaseous propellant from said gas plenum to the thruster at said desired controllable low pressure and at a first desired controllable flow rate.

15. The propellant feed system as defined in claim 14 wherein said controllable valve is pulsed at about a 50% duty cycle to actively control the flow of said liquid propellant out of said liquid propellant storage chamber and into said gas generator.

16. The propellant feed system as defined in claim 14 wherein said gas generator includes a flow limiter for providing a fixed flow rate of said liquid propellant into said gas generator at a given pressure.

17. The propellant feed system as defined in claim 14 further comprising a second plenum communicating with said gas generator, said second plenum controllably accumulating said gas propellant up to a desired second pressure from said gas generator for delivery of a start-up pulse to the thruster.

18. The propellant feed system as defined in claim 14 further comprising a actively controllable inlet gas plenum valve and an actively controllable outlet gas plenum valve, said inlet gas plenum valve actively controls the flow of said gaseous propellant into said gas plenum up to said desired controllable pressure and said outlet gas plenum valve actively controls the delivery of said first gaseous propellant to said orifice.

19. The propellant feed system as defined in claim 18 further comprising control means for actively controlling in real time said controllable valve and said inlet and outlet gas plenum valves in order to deliver said gaseous propellant to the thruster at a adjustable flow rate which is substantially continuous and steady.

20. A method for delivering a gas propellant having a substantially continuously and stable flow rate to a an arcjet, said method comprising the steps of:

actively controlling delivery of a liquid propellant to a gas generator;

generating said gas propellant in said gas generator upon receipt of said liquid propellant;

actively controlling delivery of said gas propellant generated in said gas generator to a gas plenum;

controllably accumulating said gas propellant up to a desired controllable pressure in said gas plenum; and actively delivering said gas propellant at said desired pressure through an orifice to the arcjet, wherein said gas propellant is delivered at a substantially constant controllable flow rate to the arcjet.

21. The method as defined in claim 20 wherein the step of actively controlling delivery of said liquid propellant to said gas generator further includes the step of pulsing a controllable valve at a duty cycle of about 50%.

22. The method as defined in claim 20 wherein the step of controllably accumulating said gaseous propellant up to a desired controllable pressure further includes the steps of:

continuously monitoring the pressure within said gas plenum; and controllably accumulating said gaseous propellant up to said desired pressure based on said pressure.

23. The method as defined in claim 20 wherein the step of actively delivering said gaseous propellant at said desired pressure through said orifice to the low power arcjet further includes the steps of:

controllably delivering said gaseous propellant to the low power arcjet through said orifice on demand; and providing a substantially constant low flow rate of about 5 milligrams per second of said gaseous propellant to said low power arcjet.

\* \* \* \* \*